March 30, 1943.   G. W. LANCASTER   2,315,260
REAR VIEW MIRROR
Filed Dec. 12, 1941
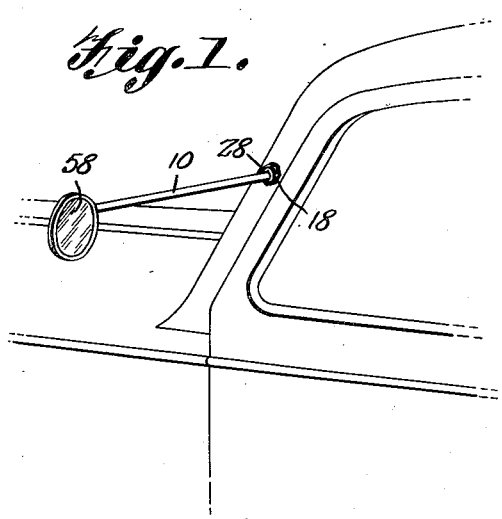
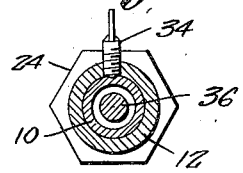
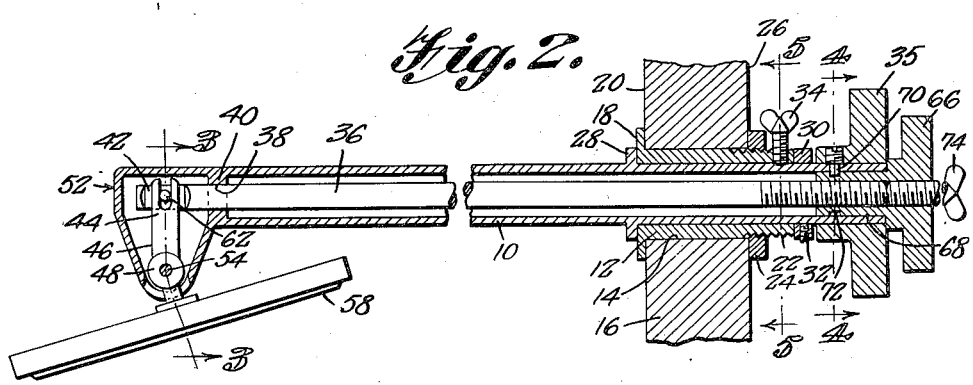
George W. Lancaster,
INVENTOR.
BY
*Victor J. Evans & Co.*
ATTORNEYS Patented Mar. 30, 1943

2,315,260

UNITED STATES PATENT OFFICE 2,315,260

REARVIEW MIRROR

George W. Lancaster, Bethesda, Md.

Application December 12, 1941, Serial No. 422,766

5 Claims. (Cl. 88—98)

My invention relates to automotive vehicles, and has among its objects and advantages the provision of an improved rear view mirror of the type mounted exteriorly of the vehicle, in which novel means are incorporated for imparting pivotal motion to the mirror about vertical and horizontal axes from a position inside the vehicle to the end that the rear view mirror may be accurately adjusted to the needs of the driver.

In the accompanying drawing:

Figure 1 is a perspective view of the rear view mirror mounted on the corner post structure of the vehicle;

Figure 2 is a top plan view of the rear view mirror structure with the greater portion of the structure illustrated in section;

Figure 3 is a sectional view taken along the line 3—3 of Figure 2;

Figure 4 is a sectional view taken along the line 4—4 of Figure 2; and

Figure 5 is a sectional view taken along the line 5—5 of Figure 2.

In the embodiment selected for illustration, I make use of a tube 10 extending through a bushing 12 fitting snugly in a bore 14 in the corner post structure 16 of the vehicle. One end of the bushing 12 is provided with a flange 18 engaging the outer face 20 of the structure 16, with the other end of the sleeve externally threaded at 22 for reception of a nut 24 engaging the inner face 26 of the structure 16. Thus the sleeve 12 may be securely clamped to the post structure.

Tube 10 fits snugly in the sleeve 12 and is provided with a flange 28 engaging the flange 18. While the tube 10 may be rotated relatively to the sleeve 12, the tube is restrained from relative endwise movement by reason of a collar 30 mounted on the tube adjacent the inner end of the sleeve 12 and secured thereto by a setscrew 32. A setscrew 34 is threaded in the sleeve 12 for engagement with the outer face of the tube 10 to frictionally support the tube against accidental rotation but the tube may be conveniently rotated through the medium of a handwheel 35.

Inside the tube 10 is located a rod 35 rotatably supported in a bore 38 in a flange 40. This rod is provided with a flattened portion 42 receivable between flanges 44 on an arm 46 provided with a body 48 fitting between walls 50 of a housing 52 at the outer end of the tube 10. Body 48 is pivoted to the housing 52 by a pin 54 extending through openings 56 in the walls 50. To the outer end of the arm 46 is secured a mirror or reflector 58, and the housing 52 is provided with an opening 60 through which the outer end of the arm 46 extends so that the reflector 58 may be pivoted about the axis of the pin 54 through endwise movement of the rod 36.

A pin 62 extends through the flattened portion 42 and projects through slots 64 in the flanges 44 to pivotally connect the arm 46 with the rod 36. Since the body 48 fits snugly between the side walls 50 of the housing 52, the rod 36 is restrained from rotary movement by reason of the close fitting engagement between the flattened portion 42 and the flanges 44.

Axial movement is imparted to the rod 36 through the medium of a handwheel 66 having a sleeve hub 68 rotatably fitting inside the tube 10 and threadedly connected with the rod 36. The hub 68 is restrained from axial movement inside the tube 10 by reason of a pin 70 threadedly connected with the handwheel 35 and extending into a circumferential groove 72 in the hub 68. Thus rotation of the handwheel 35 rotates the tube 10 for pivoting the reflector 58 about a horizontal axis, while rotation of the handwheel 66 relative to the tube 10 imparts axial movement to the rod 36 for pivoting the reflector 58 about an axis at right angles to the tube 10. A setscrew 74 is threaded axially into the handwheel 66 and the hub 68 for engagement with the rod 36 to fixedly secure the handwheel 66 against accidental rotation. Flange 18 is preferably of nut-like configuration for the application of a wrench when the nut 24 is being loosened or tightened.

The reflector 58 is connected with the arm 46 close to the upper edge margin of the reflector so as to lower the reflector and thereby provide better visibility of the highway forwardly of the vehicle.

I provide a rear view mirror which may be easily adjusted from a position inside the vehicle in accordance with the needs of the driver. While conventional rear view mirrors may be adjusted to different angular positions, such adjustment is accomplished from a position exteriorly of the vehicle and is difficult if not impossible to perform while the vehicle is in motion. In the instant case the handwheels 35 and 66 may be adjusted from a position inside the vehicle, with the handwheels so located as not to bring the hand or the arm in a position which obstructs the view.

Without further elaboration, the foregoing will so fully illustrate my invention, that others may, by applying current knowledge, readily adapt the same for use under various conditions of service.

I claim:

1. In an automotive vehicle, a rear view mirror comprising a support having an opening, a tube extending through said opening, a sleeve extending through said opening and rotatably supporting said tube, means acting on said sleeve and the tube to frictionally secure the tube against accidental rotation, a reflector mounted on one end of said tube for pivotal movement about an axis at an angle to the axis of said tube, a grip on the second end of the tube to rotate the latter and adjust said reflector about the axis of the tube, a rod extending through said tube and having one end connected with the reflector to pivot the latter about said first-mentioned axis, and a grip operatively connected with the second end of the rod to impart longitudinal motion thereto through rotation of the last-mentioned grip.

2. The invention described in claim 1 wherein said means comprises a screw threaded through said sleeve and engaging said tube, and in which the sleeve is provided with a flange engaging one side of said support and a nut threaded on the sleeve and engaging the other side of the support to clamp the sleeve to the support.

3. The invention described in claim 1 wherein said last-mentioned grip is rotatably mounted in the second end of the tube but restrained from relative axial movement, and a screw connection between said rod and said last-mentioned grip.

4. The invention described in claim 1 wherein said last-mentioned grip is rotatably mounted in the second end of the tube but restrained from relative axial movement, a screw connection between said rod and said last-mentioned grip, said one end of the rod being provided with a flattened portion, and an arm on said reflector having flanges pivotally and slidably connected with the flattened portion to restrain the rod from rotation when said last-mentioned grip is rotated but imparting pivotal motion to the reflector upon longitudinal movement of the rod.

5. The invention described in claim 1 wherein said last-mentioned grip is rotatably mounted inside the second end of said tube, and a key securing the first-mentioned grip to the tube and rotatably connecting the last-mentioned grip with the tube.

GEORGE W. LANCASTER.